(12) United States Patent
Puckett

(10) Patent No.: US 9,879,948 B1
(45) Date of Patent: Jan. 30, 2018

(54) EDIBLE TARGET DISK DEVICE

(71) Applicant: John M. Puckett, Hillsboro, OH (US)

(72) Inventor: John M. Puckett, Hillsboro, OH (US)

( * ) Notice: Subject to any disclaimer, the term of this patent is extended or adjusted under 35 U.S.C. 154(b) by 0 days.

(21) Appl. No.: 15/361,459

(22) Filed: Nov. 27, 2016

(51) Int. Cl.
| | |
|---|---|
| *F41J 1/01* | (2006.01) |
| *A01K 39/01* | (2006.01) |
| *A01K 5/00* | (2006.01) |
| *A23K 10/30* | (2016.01) |
| *A23K 40/20* | (2016.01) |
| *F41J 9/16* | (2006.01) |

(52) U.S. Cl.
CPC ........ *F41J 1/01* (2013.01); *A01K 5/00* (2013.01); *A01K 39/0106* (2013.01); *A23K 10/30* (2016.05); *A23K 40/20* (2016.05); *F41J 9/16* (2013.01); *F41J 9/165* (2013.01)

(58) Field of Classification Search
CPC ..................................... F41J 9/16; F41J 9/165
USPC ................................................ 273/362–365
See application file for complete search history.

(56) References Cited

U.S. PATENT DOCUMENTS

| | | | | |
|---|---|---|---|---|
| 5,174,581 | A * | 12/1992 | Goodson ............ | A01K 39/0106 119/51.01 |
| 5,467,998 | A * | 11/1995 | Hellings ............ | A01K 39/0106 119/51.01 |
| 5,575,479 | A * | 11/1996 | Ayres ........................ | F41J 9/165 273/363 |
| 5,651,550 | A * | 7/1997 | LaVorgna .................. | F41J 1/01 273/363 |
| 5,676,377 | A * | 10/1997 | Lynn, Jr. .................... | F41J 1/01 273/362 |
| 5,967,521 | A * | 10/1999 | Hellings .................. | A01K 5/00 273/363 |
| 2002/0125643 | A1* | 9/2002 | Sullivan ..................... | F41J 5/26 273/363 |
| 2008/0066728 | A1* | 3/2008 | Halpin ....................... | F41J 9/16 124/5 |
| 2010/0207331 | A1* | 8/2010 | Boeh .......................... | F41J 9/16 273/362 |
| 2016/0273887 | A1* | 9/2016 | West .......................... | F41J 1/01 |

\* cited by examiner

*Primary Examiner* — Mark Graham
(74) *Attorney, Agent, or Firm* — RG Patent Consulting, LLC; Rachel Gilboy

(57) ABSTRACT

A biodegradable target disk device for hunters which breaks apart into edible pieces of food for small and larger animals in the hunting zone when struck by a shell from a shotgun.

11 Claims, 3 Drawing Sheets

EDIBLE TARGET DISK DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of clay pigeons and more specifically relates to an edible target disk device.

2. DESCRIPTION OF THE RELATED ART

Hunting animals for food, recreation and/or trade has been very popular sport for many years. Many animals are small and capable of quick movement so successful hunters must be able to aim and shoot at these moveable targets with extreme precision and accuracy. To develop these skills, many hunters practice by shooting at artificial targets. These artificial targets, often referred to as "skeet" or "clay pigeons" are targets for a user with a gun as the user practices speed and accuracy of his/her shots. Once the target disk is hit it shatters into many pieces falling to the ground creating litter in a hunting zone. Ideally, these targets should be constructed of completely biodegradable materials and a bonus would be to have the target separate into edible food pieces to supply food for small and larger animals in the hunting zone.

Various attempts have been made to solve the above-mentioned problems such as those found in U.S. Pat. No. 5,174,581 to Deborah A. Goodson; U.S. Pat. No. 5,467, 998A to Deborah Hellings; and U.S. Publication No. 2010/0207331 to Adrian Boeh, et al. This prior art is representative of clay pigeons. None of the above inventions and patents, taken either singly or in combination, is seen to describe the invention as claimed.

Ideally, an edible target disk device should provide improvements in the composition of a biodegradable target disk and, yet would operate reliably and be manufactured at a modest expense. Thus, a need exists for a reliable edible target disk device to avoid the above-mentioned problems.

BRIEF SUMMARY OF THE INVENTION

In view of the foregoing disadvantages inherent in the known clay pigeon art, the present invention provides a novel edible target disk device. The general purpose of the present invention, which will be described subsequently in greater detail is to provide a biodegradable target disk for hunters which breaks apart into edible pieces of food for small and larger animals in the hunting zone.

An edible target disk device for use with a launching device is disclosed herein, in a preferred embodiment, comprising a mixture adapted to produce food for wildlife, and a disk mold adapted to contain the mixture.

The mixture includes a sweetener adapted to sweeten the mixture for consumption by wildlife, a plurality of seeds adapted to feed wildlife, a fragrance agent adapted to attract wildlife, a solidifying agent adapted to harden elements of the mixture, and a predetermined amount of water adapted to serve as a mixing agent for the sweetener, the plurality of seeds, the fragrance agent, and the solidifying agent.

The disk mold includes a hollow interior adapted to contain the mixture, an opening, and a covering adapted to cover the opening. The opening allows pouring of the mixture into the hollow interior. The disk mold is adapted to be launched by a launching device for targeting by a user, and break apart upon being hit by shells from a shotgun.

The mixture is adapted to be mixed and heated to a temperature ranging from two hundred ninety degrees Fahrenheit to approximately three hundred twenty degrees Fahrenheit with continuous stirring to reach a desired texture and placed into the hollow interior of the disk mold via the opening. The mixture is also adapted to harden as it cools within the hollow interior of the disk mold. The mixture is further adapted to be shattered into a plurality of edible pieces when shells from a shotgun impact and shatter the disk mold thereby releasing the edible contents into edible pieces from the disk mold.

The sweetener includes a concentration of sugar equaling approximately thirty percent to fifty-five percent of the total mixture. The plurality of seeds equals approximately eleven percent to twenty-one percent of the total mixture. The plurality of seeds is selected from a group of seed types consisting of corn, wheat, oats, barley, rice, soybeans, cotton seeds, and a combination thereof. The fragrance agent equals approximately one percent of the total mixture. The solidifying agent equals approximately eleven percent to twenty-one percent of the total mixture. The solidifying agent is selected from a group of solidifying agents consisting of corn syrup, molasses, butter, and a combination thereof. The predetermined amount of water equals approximately ten percent to fifteen percent of the total mixture.

The disk mold is formed from biodegradable material adapted to break down into carbon dioxide, water, and biomass having a dome-shape with a diameter of approximately four and one fourth inches, a height of approximately one inch, and a thickness of approximately one eighth inch. The covering is adapted to fit onto the opening of the disk mold to releasably enclose the mixture, with the covering being held in place via friction created between the opening and the covering.

The disk mold is further formed having an aerodynamic shape adapted to minimize air resistance when the disk mold is shot from a launching device and used as a target.

The present invention holds significant improvements and serves as an edible target disk device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an edible target disk device constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a clay pigeon and more particularly to an edible target disk device as used to provide a biodegradable target disk for hunters which breaks apart into edible pieces of food for small and larger animals in the hunting zone.

Generally speaking, an edible target disk device is a target skeet formed from biodegradable material that encloses a mixture of a sweetener, a plurality of seeds, a fragrance agent, a solidifying agent, and water to provide food for animals in the shooting area when the disk mold is scattered after being struck by a shell shot from a shotgun.

Figure 1:
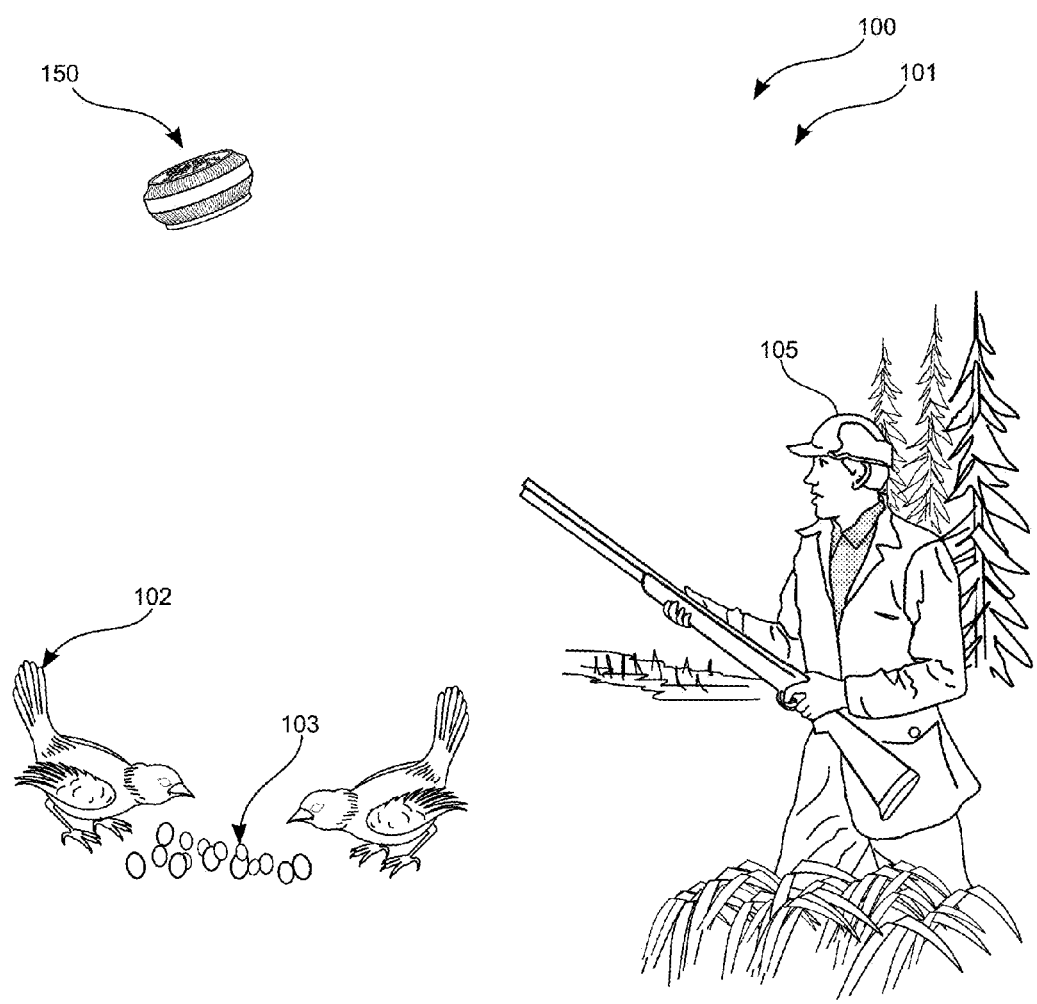
FIG. 1 shows a perspective view illustrating an edible target disk device in an in use condition according to an embodiment of the present invention.

Referring to the drawings by numerals of reference there is shown in FIG. 1, a perspective view illustrating edible target disk device 100 in an in use condition 101 according to an embodiment of the present invention.

Edible target disk device 100 for use with a launching device is disclosed herein, in a preferred embodiment, comprising mixture 110 adapted to produce food 102 for wildlife 103, and disk mold 160 adapted to contain mixture 110.

Mixture 110 includes sweetener 115 adapted to sweeten mixture 110 for consumption by wildlife 103, plurality of seeds 120 adapted to feed wildlife 103, fragrance agent 125 adapted to attract wildlife 103, solidifying agent 130 adapted to harden elements of mixture 110, and predetermined amount of water 135 adapted to serve as a mixing agent for sweetener 115, plurality of seeds 120, fragrance agent 125, and solidifying agent 130.

Disk mold 150 includes hollow interior 155 adapted to contain mixture 110, opening 165, and covering 170 adapted to cover opening 165. Opening 165 allows pouring of mixture 110 into hollow interior 155. Disk mold 150 is adapted to be launched by a launching device for targeting by user 105, and break apart upon being hit by shells from a shotgun.

Figure 2:
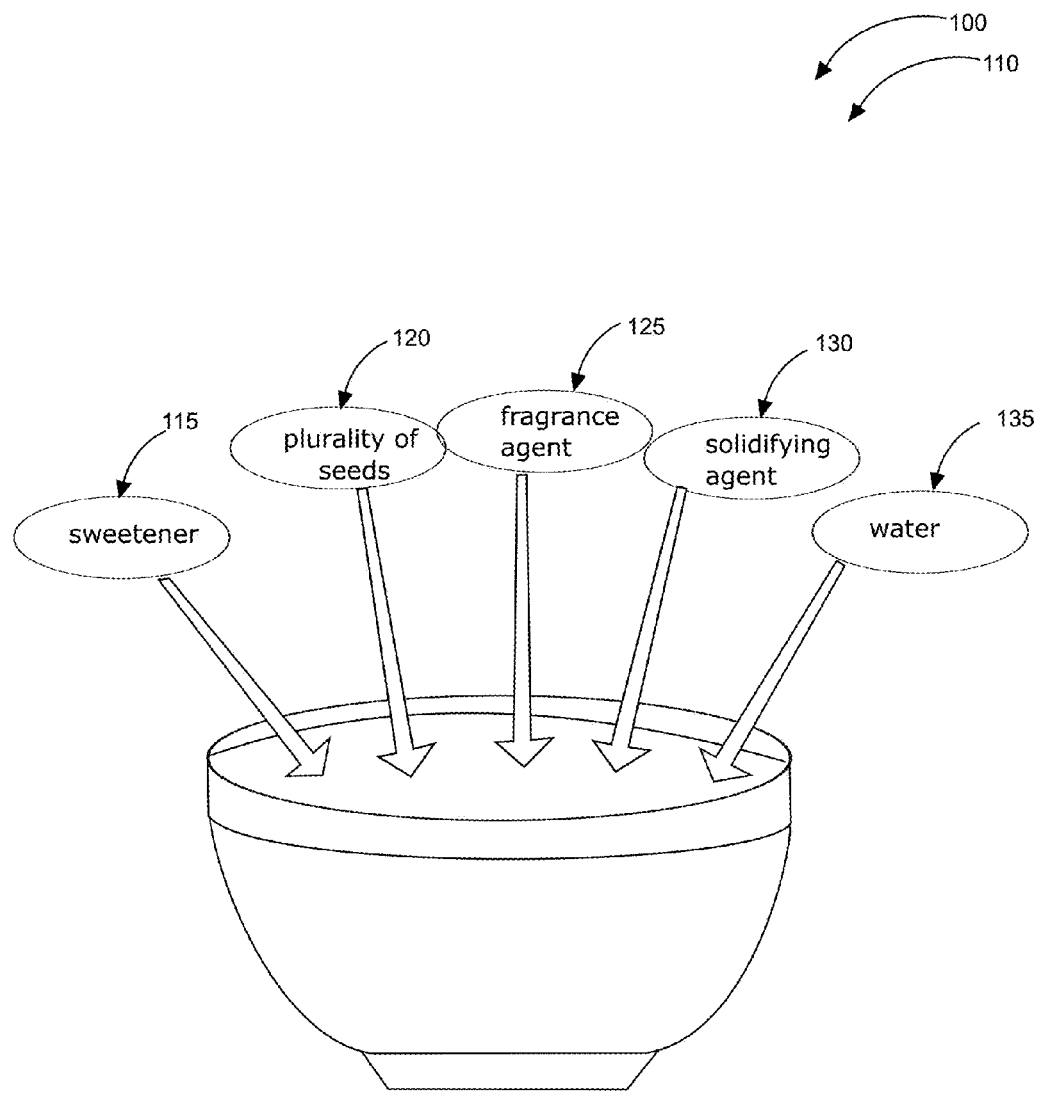
FIG. 2 is a perspective view illustrating an edible target disk device mixture according to an embodiment of the present invention of FIG. 1.

Referring now to FIG. 2, a perspective view illustrating edible target disk device 100 mixture 110 according to an embodiment of the present invention of FIG. 1.

Mixture 110 is adapted to be mixed and heated to a temperature ranging from two hundred ninety degrees Fahrenheit to approximately three hundred twenty degrees Fahrenheit with continuous stirring to reach a desired texture and placed into hollow interior 155 of disk mold 150 via opening 165. Mixture 110 is also adapted to harden as it cools within hollow interior 155 of disk mold 150. Mixture 110 is further adapted to be shattered into a plurality of edible pieces when shells from a shotgun impact and shatter disk mold 150 thereby releasing the edible contents into edible pieces from disk mold 150.

Sweetener 115 includes a concentration of sugar equaling approximately thirty percent to fifty-five percent of the total mixture 110. Plurality of seeds 120 equals approximately eleven percent to twenty-one percent of the total mixture 110. Plurality of seeds 120 is selected from a group of seed types consisting of corn, wheat, oats, barley, rice, soybeans, cotton seeds, and a combination thereof. Fragrance agent 125 equals approximately one percent of the total mixture 110. Solidifying agent 130 equals approximately eleven percent to twenty-one percent of the total mixture 110. Solidifying agent 130 is selected from a group of solidifying agents consisting of corn syrup, molasses, butter, and a combination thereof. Predetermined amount of water 135 equals approximately ten percent to fifteen percent of the total mixture 110.

Figure 3:
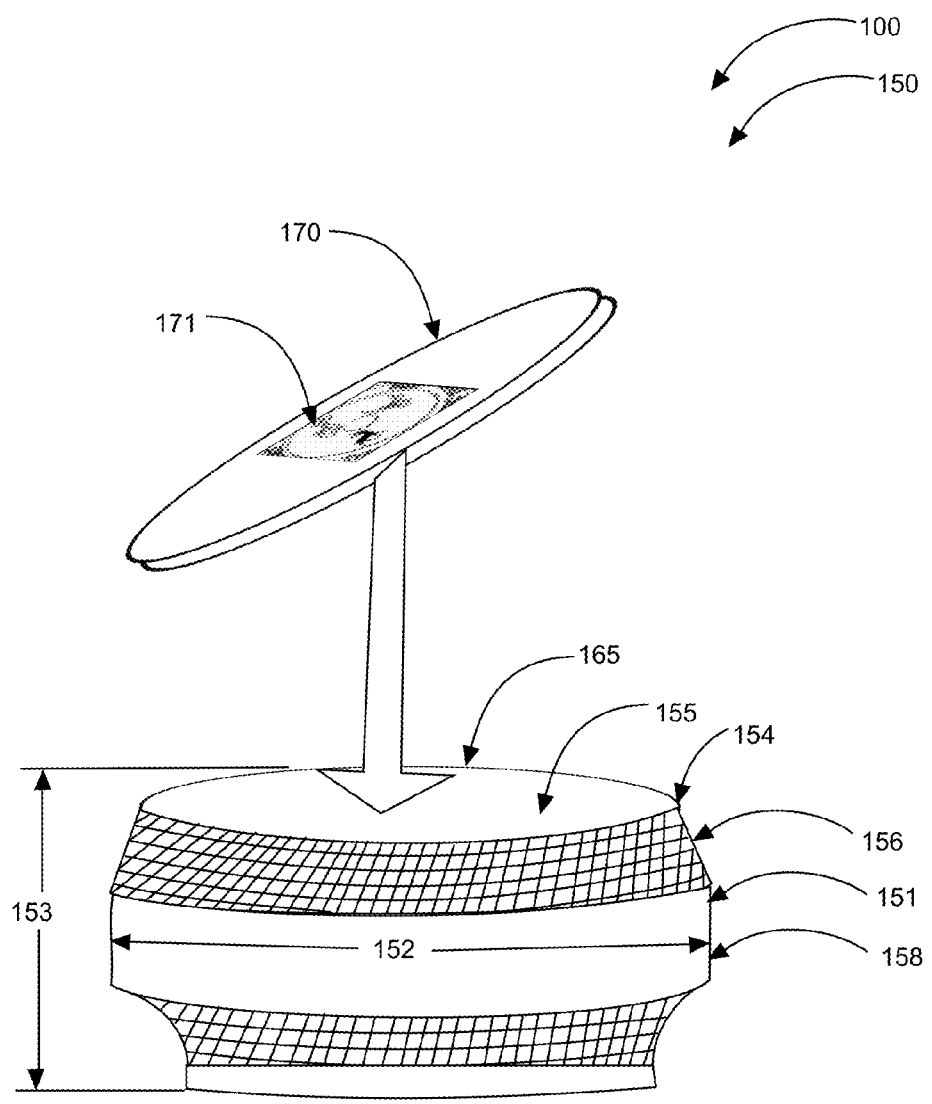
FIG. 3 is a perspective view illustrating an edible target disk device disk mold according to an embodiment of the present invention of FIG. 1.

Referring now to FIG. 3, a perspective view illustrating edible target disk device 100 disk mold 150 according to an embodiment of the present invention of FIG. 1.

Disk mold 150 is formed from biodegradable material adapted to break down into carbon dioxide, water, and biomass for absorption into the ground. Disk mold 150 has an approximate dome shape 151 with diameter 152 of approximately four and one fourth inches, height 153 of approximately one inch, and thickness 154 of approximately one eighth inch. Any appropriate shape 151 for disk mold 150 may be used. Disk mold 150 may include grids 156 for outside surface 158 or disk mold 150 may be formed with solid outside surface 158. Covering 170 may include indicia and artwork 171.

Covering 170 is adapted to fit onto opening 165 of disk mold 150 to releasably enclose mixture 110, with covering 170 being held in place via friction created between opening 165 and covering 170.

Disk mold 150 is further formed having an aerodynamic shape adapted to minimize air resistance when disk mold 150 is shot from a launching device and used as a target.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An edible target disk device for use with a launching device comprising:
   a mixture adapted to produce food for wildlife, said mixture including:
      a sweetener adapted to sweeten said mixture for consumption by wildlife;
      a plurality of seeds adapted to feed wildlife;
      a fragrance agent adapted to attract wildlife;

a solidifying agent adapted to harden elements of said mixture; and a predetermined amount of water adapted to serve as a mixing agent for said sweetener, said plurality of seeds, said fragrance agent, and said solidifying agent; and a disk mold adapted to contain said mixture, said disk mold being formed from biodegradable material adapted to break down into carbon dioxide, water, and biomass and including:

a hollow interior adapted to contain said mixture;

an opening; and a covering adapted to cover said opening and allow pouring of said mixture into said hollow interior;

wherein said mixture is adapted to be mixed and heated and placed into said hollow interior of said disk mold via said opening;

wherein said mixture is adapted to cool and harden within said hollow interior; and wherein said disk mold is adapted to be launched by a launching device for targeting by a user, and upon being hit by shells from a shotgun breaks apart; and wherein said mixture is adapted to be shattered into said plurality of edible pieces when shells from a shotgun impact and shatter said disk mold thereby releasing said edible contents from said disk mold.

2. The edible target disk device of claim 1 wherein said sweetener includes a concentration of sugar equaling approximately thirty percent to fifty-five percent of total said mixture.

3. The edible target disk device of claim 1 wherein said plurality of seeds equals approximately eleven percent to twenty-one percent of total said mixture.

4. The edible target disk device of claim 3 wherein said plurality of seeds is selected from a group of seed types consisting of corn, wheat, oats, barley, rice, soybeans, cotton seeds, and a combination thereof.

5. The edible target disk device of claim 1 wherein said fragrance agent equals approximately one percent of total said mixture.

6. The edible target disk device of claim 1 wherein said solidifying agent equals approximately eleven percent to twenty-one percent of total said mixture.

7. The edible target disk device of claim 6 wherein said solidifying agent is selected from a group of solidifying agents consisting of corn syrup, molasses, butter, and a combination thereof.

8. The edible target disk device of claim 1 wherein said predetermined amount of water equals approximately ten percent to fifteen percent of said mixture.

9. The edible target disk device of claim 1 wherein said disk mold is formed having an approximate dome-shape with a diameter of approximately four and one fourth inches, a height of approximately one inch, and a thickness of approximately one eighth inch.

10. The edible target disk device of claim 1 wherein said covering is adapted to fit onto said opening of said disk mold to releasably enclose said mixture, said covering being held in place via friction created between said opening and said covering.

11. The edible target disk device of claim 1 wherein said disk mold is formed having an aerodynamic shape adapted to minimize air resistance when said disk mold is shot from a launching device.

\* \* \* \* \*